(12) United States Patent
Nakajima

(10) Patent No.: US 12,028,913 B2
(45) Date of Patent: Jul. 2, 2024

(54) COMMUNICATION APPARATUS, CONTROL METHOD, AND COMPUTER-READABLE STORAGE MEDIUM

(71) Applicant: CANON KABUSHIKI KAISHA, Tokyo (JP)

(72) Inventor: Takafumi Nakajima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/080,621

(22) Filed: Oct. 26, 2020

(65) Prior Publication Data

US 2021/0136847 A1 May 6, 2021

(30) Foreign Application Priority Data

Oct. 30, 2019 (JP) ................................. 2019-198007

(51) Int. Cl.
| | |
|---|---|
| *H04W 76/14* | (2018.01) |
| *H04W 8/24* | (2009.01) |
| *H04W 12/50* | (2021.01) |
| *H04W 76/15* | (2018.01) |
| *H04W 84/18* | (2009.01) |
| *H04W 92/18* | (2009.01) |

(52) U.S. Cl.
CPC ............. *H04W 76/14* (2018.02); *H04W 8/24* (2013.01); *H04W 12/50* (2021.01); *H04W 76/15* (2018.02); *H04W 84/18* (2013.01); *H04W 92/18* (2013.01)

(58) Field of Classification Search
CPC ..... H04W 12/50; H04W 24/02; H04W 76/14; H04W 76/15; H04W 8/24; H04W 84/18; H04W 92/18
See application file for complete search history.

(56) References Cited

U.S. PATENT DOCUMENTS

| | | | | |
|---|---|---|---|---|
| 11,139,884 B1* | 10/2021 | Singh | ................. | H04B 7/15507 |
| 2010/0054121 A1* | 3/2010 | Sakai | .................... | H04W 48/16 |
| | | | | 370/329 |
| 2012/0184204 A1* | 7/2012 | Kazmi | ............... | H04B 7/15542 |
| | | | | 455/7 |
| 2014/0003293 A1* | 1/2014 | Borges | .................. | H04W 76/14 |
| | | | | 370/255 |
| 2015/0085699 A1 | 3/2015 | Ho | | |
| 2015/0156260 A1* | 6/2015 | Nishigaki | ............. | H04W 40/00 |
| | | | | 709/223 |

(Continued)

FOREIGN PATENT DOCUMENTS

| | | |
|---|---|---|
| CN | 106664742 A | 5/2017 |
| CN | 109842911 A | 6/2019 |

(Continued)

*Primary Examiner* — Saumit Shah
(74) *Attorney, Agent, or Firm* — Canon U.S.A., Inc. IP Division

(57) ABSTRACT

A communication apparatus is provided which operates as a base station. The communication apparatus communicates with a control apparatus for controlling a network comprised of a plurality of base stations. The communication apparatus is one of the plurality of base stations that is part of the network. The communication apparatus establishes, with another base station belonging to the network, a link to be used for communication with the other base station; and notifies, in a case where a plurality of the links is established with the another base station, the control apparatus of establishment of the link.

24 Claims, 8 Drawing Sheets

(56) References Cited

U.S. PATENT DOCUMENTS

| | | | |
|---|---|---|---|
| 2015/0180779 A1* | 6/2015 | Geetha Gopalakrishnan | H04L 41/0833 370/235 |
| 2015/0382348 A1* | 12/2015 | Hara | H04W 72/0453 370/329 |
| 2017/0156153 A1* | 6/2017 | Hart | H04W 40/246 |
| 2017/0187446 A1* | 6/2017 | Buesker | H04B 7/15557 |
| 2018/0278625 A1* | 9/2018 | Cammarota | H04L 9/3268 |
| 2018/0302832 A1* | 10/2018 | Huang | H04W 36/00835 |
| 2019/0166537 A1 | 5/2019 | Sakai | |
| 2019/0208413 A1* | 7/2019 | Chiou | H04W 48/16 |
| 2019/0306710 A1 | 10/2019 | Cammarota | |
| 2020/0053773 A1* | 2/2020 | Seok | H04W 74/08 |
| 2021/0136847 A1* | 5/2021 | Nakajima | H04W 76/14 |
| 2021/0219368 A1* | 7/2021 | Fujishiro | H04W 76/19 |
| 2021/0385778 A1* | 12/2021 | Ahn | H04W 60/00 |
| 2021/0385779 A1* | 12/2021 | Oteri | H04W 60/04 |

FOREIGN PATENT DOCUMENTS

| | | | |
|---|---|---|---|
| JP | 2011530216 A | 12/2011 | |
| JP | 2016539596 A | 12/2016 | |
| JP | 2019-509703 A | 4/2019 | |
| WO | 2010014559 A2 | 2/2010 | |
| WO | 2015048137 A2 | 4/2015 | |
| WO | 2017/161361 A2 | 9/2017 | |
| WO | 2018/194930 A1 | 10/2018 | |
| WO | 2018194930 A1 | 10/2018 | |

\* cited by examiner

COMMUNICATION APPARATUS, CONTROL METHOD, AND COMPUTER-READABLE STORAGE MEDIUM

BACKGROUND

Field

The present disclosure relates to establishment of a link for communication in a computer network.

Description of the Related Art

Techniques have been developed for comprehensively handling a plurality of networks, as one network, each of the plurality of networks configured by a different one of a plurality of access points (APs). And each such access point operating as a base station which can configure a network. Such a combined network including a plurality of networks each configured by a different one of a plurality of APs can be referred to as a Multi-AP network (MAP network). The MAP network can include a control apparatus for controlling APs belonging to the MAP network. The control apparatus can be referred to as a Multi-AP Controller (hereinafter simply referred to as "a controller" for convenience). Each of the plurality of APs that belongs to the MAP network and is controlled by the controller can be referred to as a Multi-AP Agent (hereinafter simply referred to as "an agent" for convenience).

The controller and an agent can establish a communication link called a backhaul link to perform backhaul communication. Likewise, an agent and another agent can establish a backhaul link to perform backhaul communication. The controller can implement efficient network control between agents belonging to the MAP network by using information which is obtained, by backhaul communication, from agents belonging to the MAP network.

International Publication No. WO2017161361A discloses a technique for controlling such a combined network including a plurality of such agents connected via backhaul communication.

In a case where an AP operating as an agent of the MAP network has a plurality of wireless interfaces (I/Fs), the AP can configure wireless networks in a plurality of frequency bands at the same time. An AP capable of configuring wireless networks in a plurality of frequency bands at the same time can establish a plurality of backhaul links for backhaul communication with an AP having the same capability, via the plurality of networks configured by the AP.

SUMMARY

According to various embodiments of the present disclosure, there is provided a communication apparatus which operates as a base station. The communication apparatus includes a communication unit configured to communicate with a control apparatus for controlling a network comprised of a plurality of base stations. Each of the plurality of base stations has a function for configuring a base station network, and the communication apparatus is one of the plurality of base stations. The communication apparatus has an establishment unit configured to establish, with another base station belonging to the network, a link to be used for communication with the another base station; and a notification unit configured to notify, in a case where a plurality of the links is established with the another base station, the control apparatus of establishment of the link, via the communication unit.

Further features will become apparent from the following description of exemplary embodiments with reference to the attached drawings.

DESCRIPTION OF THE EMBODIMENTS

Exemplary embodiments will be described in detail below with reference to the accompanying drawings. Configurations described in the following exemplary embodiments are to be considered as illustrative, and the present invention is not limited to illustrated configurations.

Figure 1:
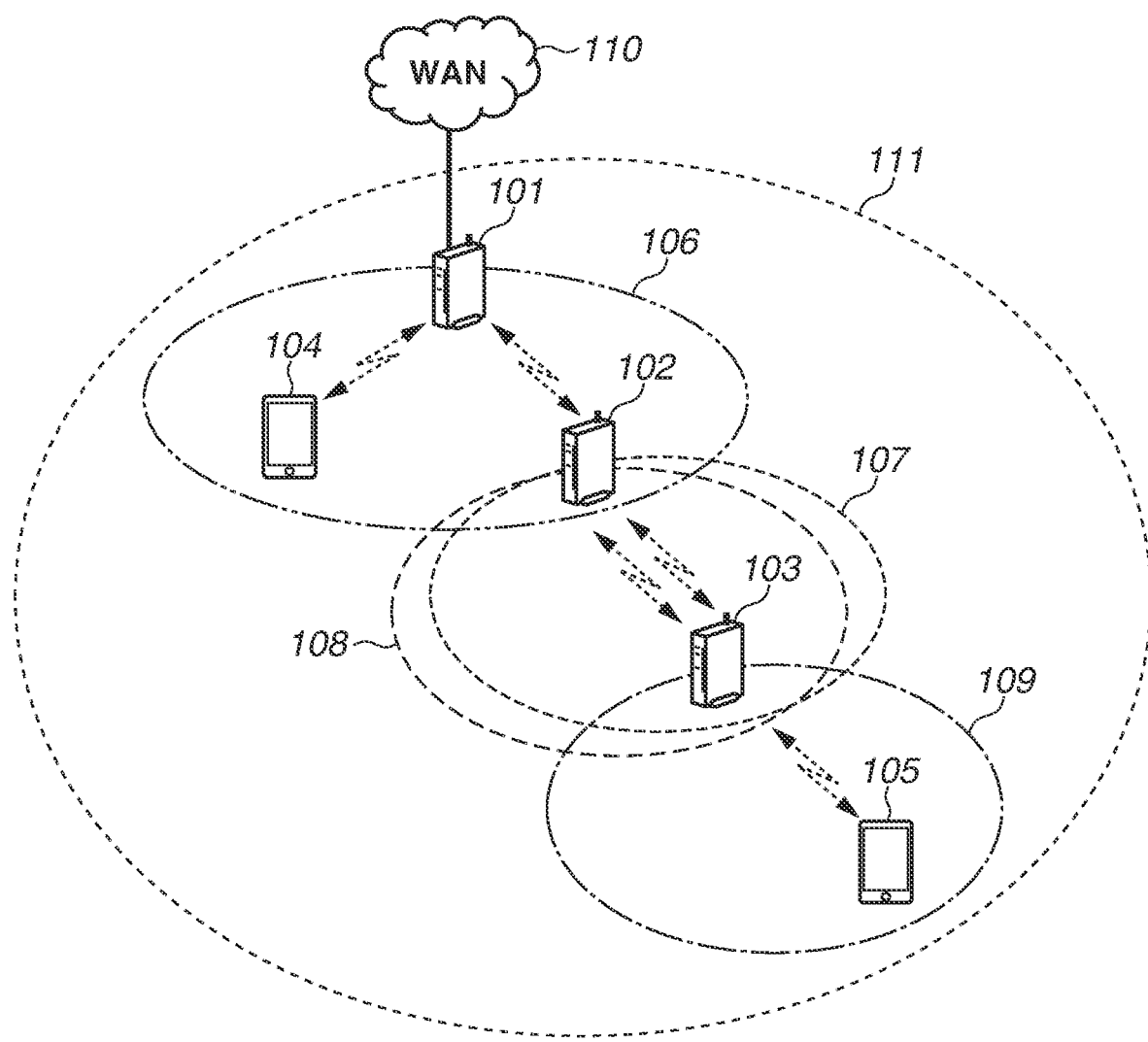
FIG. 1 is a diagram illustrating network configurations joined by access points (APs) 101, 102 and 103.

FIG. 1 is a diagram illustrating network configurations joined by an access point (AP) 101 according to the present exemplary embodiment. The APs 101, 102 and 103 are access points each having a function of configuring a Basic Service Set (BSS) network. The AP 101 configures a network 106, the AP 102 configures networks 107 and 108, and the AP 103 configures a network 109. Stations (STAs) 104 and 105 have a function of joining a network. The STAs 104 and 105 join the networks 106 and 109, respectively. The AP 101 connects with a Wide Area Network (WAN) 110 and is capable of communicating with an external network such as the Internet.

According to the present exemplary embodiment, the networks 106, 107, 108, and 109 are wireless LAN networks conforming to the Institute of Electrical and Electronic Engineers (IEEE) 802.11 Series standard. More specifically, each network conforms to at least either one of the IEEE 802.11a/b/g/n/ac/ax/be standards.

Alternatively, each network may conform to other communication standards, such as Bluetooth®, Near Field Communication (NFC), Ultra Wide Band (UWB), ZigBee, and Multi Band OFDM Alliance (MBOA), in addition to the IEEE 802.11 Series standard. UWB includes wireless Universal Serial Bus (USB), wireless 1394, and WiNET. In addition to the IEEE 802.11 Series standard, each network may also conform to the Wi-Fi Direct standard devised by Wi-Fi Alliance, and wired communication standards such as wired local area network (LAN).

According to the present exemplary embodiment, the AP 102 having a plurality of wireless interfaces can configure a plurality of networks (networks 107 and 108) at the same time. In this case, the networks 107 and 108 use different frequency bands. For example, when the network 107 uses the 2.4 GHz band, the network 108 uses the 5 GHz band. Alternatively, even in a case where the networks 107 and 108 use the same frequency band, the networks 107 and 108 may use frequency channels with a lower interference power. For example, when the network 107 uses a channel belonging to W52 in the 5 GHz band, the network 108 may use a channel belonging to W53. In this way, the AP 102 can maintain a plurality of networks at the same time.

According to the present exemplary embodiment, the APs 101, 102 and 103 conform to the Wi-Fi EasyMesh standard. In this case, a network that includes the networks 106, 107, 108, and 109 is referred to as a Multi-AP (MAP) network 111. The MAP network 111 includes the AP 101, 102 and 103. The AP 101 operates as a Multi-AP controller (controller) having a role of controlling the entire MAP network 111. In the MAP network 111, the APs 102 and 103 operate as Multi-AP agents (agents) having a role of operating based on control instructions from the controller. The AP 101 may have the function of an agent in addition to the function of the controller. In this case, the controller (AP 101) and the agents perform control processing by internal data exchange. While, in the present exemplary embodiment, the controller of the MAP network 111 also has the function of an AP, the present invention is not limited thereto. In other embodiments, the controller may not have the function of an AP.

The APs 102 and 103 (agents) can communicate with the AP 101 (controller) via the MAP network 111. More specifically, the AP 102 (agent) has a backhaul STA function for joining the network 106 configured by the AP 101 (controller) as a STA. The AP 102 (agent) uses the backhaul STA function to join the network 106 configured by the AP 101 (controller), and then the APs 101 and 102 can communicate with each other. The function used by the AP 102 as an AP to connect with a STA is referred to as a front-haul AP function. The AP 103 joins the network 107 configured by the AP 102 as a STA, and then the AP 103 can communicate with the AP 101 via the AP 102. In this way, the APs 102 and 103 (agents) can join the MAP network 111 by configuring networks as APs and at the same time joining a network configured by another AP as STAs. The network which is configured by another AP and joined by the AP 102 or 103 (agent) as a STA is referred to as a backhaul BSS network from the standpoint of the AP 102 or 103. Meanwhile, the network which is configured by the AP 102 or 103 as an AP and joined by a STA or another AP is referred to as a front-haul BSS network from the standpoint of the AP 102 or 103. More specifically, the same network is referred to as a front-haul BSS network from the standpoint of the AP that configures the network, and is referred to as a backhaul BSS network from the standpoint of the AP that has joined the network.

The link which is established by an AP (agent) when the AP has joined a network configured by a different AP and used for communication with the different AP is referred to as a backhaul link. In this case, from the standpoint of the AP that has established a backhaul link with the different AP that has joined the network configured by the AP, the backhaul link is determined to have been established via the front-haul BSS network. Meanwhile, from the standpoint of the AP that has joined the network configured by the different AP and has established a backhaul link with the different AP, the backhaul link is determined to have been established via the backhaul BSS network.

The controller and agents may distinguish between a network joined by ordinary STAs and a network joined by agents, or recognize the two networks as an identical network.

A link established between an agent and a STA, and a link established between the controller and a STA are referred to as front-haul links.

The AP 101 (controller) manages and controls agents and STAs in the MAP network 111. For example, by transmitting a predetermined control message via the backhaul link, the AP 101 (controller) can control the frequency channels and the transmission power for the networks configured by the APs 102 and 103. In addition to or instead of this, the AP 101 (controller) may transfer the AP 102 or 103 (agent) to a different network. Alternatively, in addition to or instead of this, the AP 101 can control the steering of STAs. For example, the AP 101 can perform loaming for transferring the connection destination of the STA 105 having joined the network 109 configured by the AP 103 belonging to the MAP network 111 to the network 106 configured by the AP 101. Alternatively, in addition to or instead of this, the AP 101 can control data traffic between an AP and a STA or between APs and perform diagnosis of each network. In addition to or instead of this, the AP 101 can obtain information about networks from the APs 102 and 103 (agents) via the backhaul link.

The APs 102 and 103 (agents) can notify the AP 101 (controller) of information about the network via the backhaul link. Examples of network information notified from each of the APs 102 and 103 include capability information (e.g., HT Capability and VHT Capability) for the agent itself and capability information for a STA and an AP connected with the agent. Alternatively, as capability information for the agent, the agent may notify the controller of information about the wireless interface (wireless I/F) of the agent itself. Examples of information about the wireless I/F include the Media Access Control (MAC) address of the wireless I/F of the agent and the communication method of the wireless LAN supported by the agent. In a case where an agent includes a plurality of wireless IFs, the agent may notify the controller of information about the wireless IFs or only information about some of the wireless I/Fs. The present invention is not limited to wireless IFs. In a case where an agent includes a wired interface (wired I/F), the above-described information may include capability information for the wired I/F, for example. Examples of capability information of the wired I/F include information about the MAC address of the wired I/F and the physical link rate of wired communication.

A control instruction from the AP 101 (controller) is transmitted and received to/from each agent (APs 102 and 103) via the backhaul link. According to the present exemplary embodiment, a backhaul link is established between the APs 101 and 102 and between the APs 102 and 103, and then communication is performed. More specifically, the AP 102 can connect with the network 106 configured by the AP 101, as a backhaul STA, while configuring the networks 107 and 108. In this case, the network 106 from the standpoint of the AP 101 is referred to as a front-haul BSS network, the network 106 from the standpoint of the AP 102 is referred to as a backhaul BSS network. A backhaul link is established between the APs 101 and 102 via the network 106. Likewise, the AP 103 as a backhaul STA can connect with at least either one of the networks 107 and 108 configured by the AP 102 while configuring the network 109. In this case, the networks 107 and 108 from the standpoint of the AP 102 are referred to as front-haul BSS networks while the networks 107 and 108 from the standpoint of the AP 103 are referred to as backhaul BSS networks. Accordingly, backhaul links are established between the APs 102 and 103. According to the present exemplary embodiment, backhaul links may be established between the APs 102 and 103 via the networks 107 and 108. More specifically, a plurality of backhaul links may be established between the APs 102 and 103. In this case, the networks 107 and 108 are networks using frequency bands with a relatively lower interference power. For example, one frequency band is the 2.4 GHz band while the other frequency band is the 5 GHz band.

Although, in the present exemplary embodiment, an AP is an example of an apparatus having the function of the controller, the present invention is not limited thereto. Such an apparatus may be a personal computer (PC), tablet, smart phone, mobile phone, television, and other communication apparatuses in other embodiments. This also applies to an apparatus having the function of an agent. As long as these apparatuses satisfy the hardware configuration illustrated in FIG. 2, the apparatuses are not limited thereto.

Figure 2:
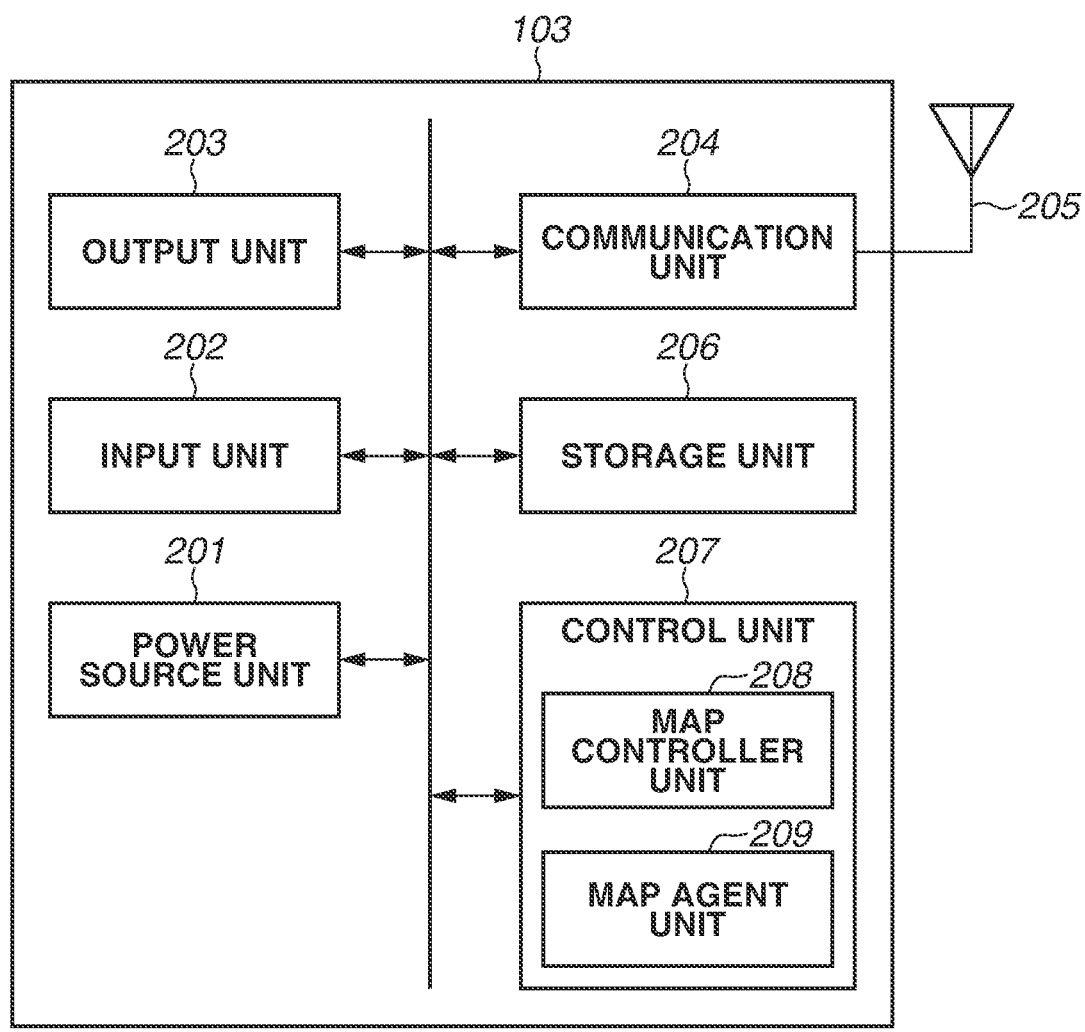
FIG. 2 is a diagram illustrating a hardware configuration of an AP 103.

FIG. 2 is a diagram illustrating a hardware configuration of the AP 103. The AP 101 includes a power source unit 201, an input unit 202, an output unit 203, a communication unit 204, an antenna 205, a storage unit 206, and a control unit 207.

The power source unit 201 supplies power to each hardware component (described below). The power source unit 201 receives power, for example, from an alternating current (AC) power source or a battery.

The input unit 202 receives various operations from the user. For example, the input unit 202 includes buttons, a keyboard, and other modules. The output unit 203 outputs various information to the user. Examples of outputs by the output unit 203 include at least either one of display to light emitting diodes (LEDs), display on a screen, audio output by a speaker, and vibration output. Both the input unit 202 and the output unit 203 may be implemented by one module, such as a touch panel. The input unit 202 and the output unit 203 may be integrated with the AP 103 or separated from the AP 103.

The communication unit 204 controls wireless communication conforming to the IEEE 802.11 Series standard. In addition to or instead of this, the communication unit 204 may control wired communication such as a wired LAN conforming to the IEEE 802.3 standard and control Internet Protocol (IP) communication. The communication unit 204 transmits and receives wireless signals via the antenna 205. Ina case where the AP 101 can configure a plurality of networks at the same time, the AP 101 may have a plurality of communication units 204 and a plurality of antennas.

The communication unit 204 includes a wireless I/F. The wireless I/F includes a Radio Frequency (RF) circuit or a wireless LAN chip. The communication unit 204 may include a plurality of wireless IFs, for example, a wireless I/F corresponding to the 2.4 GHz band and a wireless I/F corresponding to the 5 GHz band. According to the present exemplary embodiment, the AP 101 has one wireless I/F, and the APs 102 and 103 each have two wireless IFs.

The storage unit 206 includes at least either one memory such as a read only memory (ROM) and a random access memory (RAM) for storing computer programs for performing various operations (described below), communication parameters for wireless communications, and other various information. The storage unit 206 may be not only memories such as a ROM and RAM but also a flexible disk, hard disk, optical disk, magneto-optical disk, compact disc read only memory (CD-ROM), compact disc recordable (CD-R), magnetic tape, nonvolatile memory card, digital versatile disc (DVD), and other storage media. The storage unit 206 may also include a plurality of memories.

The control unit 207 includes at least either one processor such as a central processing unit (CPU) and a micro processing unit (MPU), and executes a computer program stored in the storage unit 206 to control the entire AP 103. The control unit 207 may control the entire AP 103 in collaboration with a computer program and an operating system (OS) stored in the storage unit 206. The control unit 207 generates data and signals to be transmitted in communication with other communication apparatuses. The control unit 207 may include a plurality of processors, such as multi-cores, which may control the entire AP 103.

The control unit 207 executes a program for causing the control unit 207 to function as a Multi-AP (MAP) controller unit 208 and a MAP agent unit 209 stored in the storage unit 206. The MAP controller unit 208 is a program for operating the AP 103 as the controller of the MAP network 111. The MAP agent unit 209 is a program for operating the AP 103 (agent) of the MAP network 111. In a case where the AP 103 plays the roles of both the controller and an agent at the same time, the AP 103 performs the functions of both the MAP controller unit 208 and the MAP agent unit 209. In a case where the AP 103 plays the role of only the controller, i.e., the AP 103 does not play the role of an agent, the AP 103 performs the function of only the MAP controller unit 208. In this case, the function of the MAP agent unit 209 may be deactivated. Likewise, in a case where the AP 103 plays the role of only an agent, i.e., the AP does not play the role of the controller, the AP 103 performs the function of only the MAP agent unit 209. In this case, the unit 208 may be deactivated.

The control unit 207 performs processing for setting the parameters of a wireless LAN conforming to the Wi-Fi Protected Setup (WPS) standard to establish a backhaul link, by executing a program stored in the storage unit 206. The WPS standard is devised by Wi-Fi Alliance. By setting the parameters of a WPS-based wireless LAN, the AP 101 can share the communication parameters for establishing a backhaul link, with other APs. The communication parameters include at least either one of Service Set Identifier (SSID), encryption method, encryption key, authentication method, and authentication key. The information to be shared with other APs may include information about the frequency bands to be used in addition to the communication parameters. The control unit 207 may be able to perform processing for setting the communication parameters conforming to Device Provisioning Protocol (DPP) providing higher security in addition to or instead of WPS, by executing a program stored in the storage unit 206. The DPP is devised by Wi-Fi Alliance.

The APs 101 and 102 have similar hardware configurations to the AP 103. The APs 102 and 103 do not need to have the function of the controller. In this case, the control unit 207 does not need to have the function of the MAP controller unit 208. In addition, the AP 101 does not need to have the function of an agent. In this case, the control unit 207 does not need to have the function the MAP agent unit 209. Alternatively, the AP 102 may include both the MAP controller unit 208 and the MAP agent unit 209.

Figure 3:
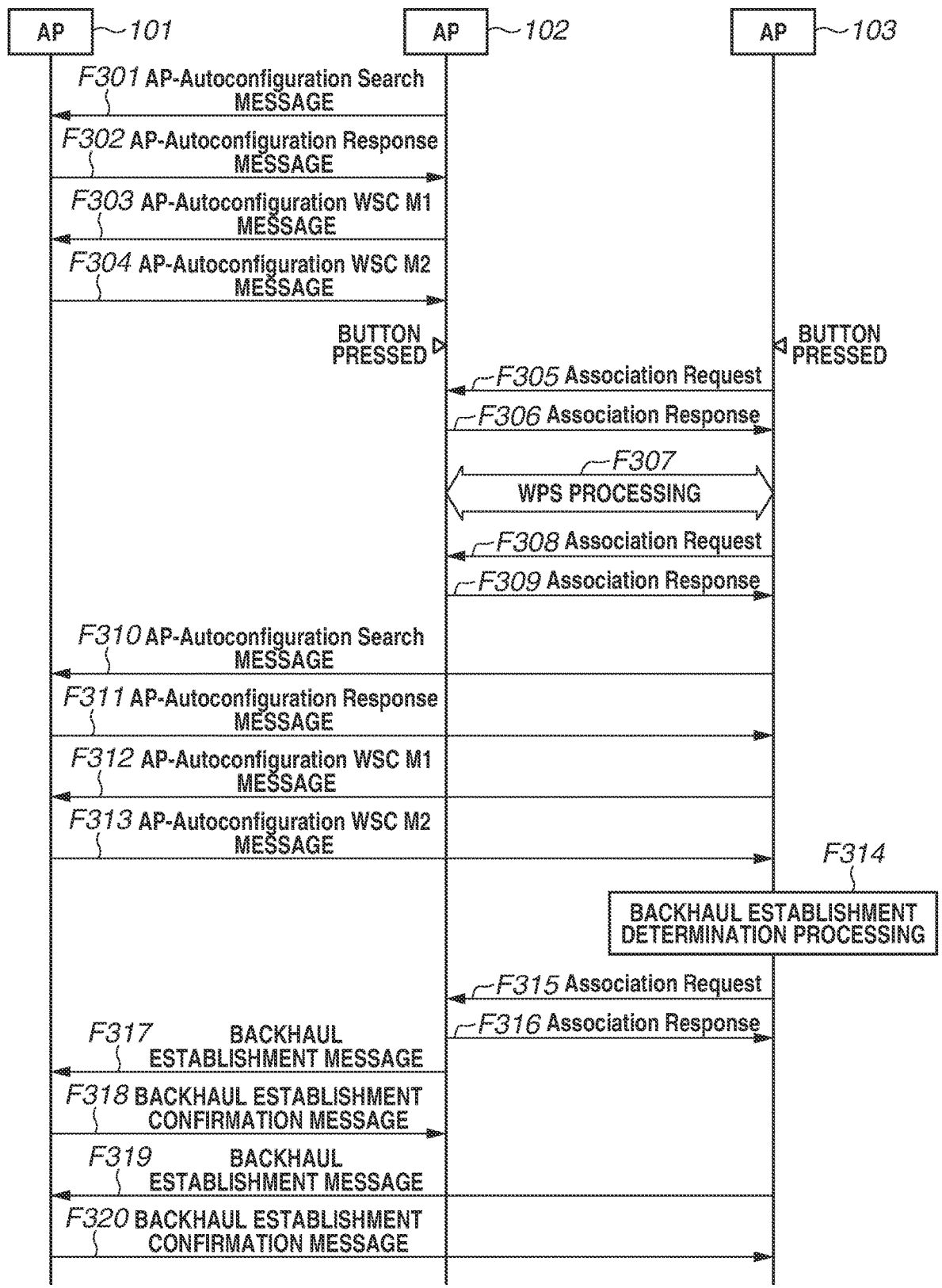
FIG. 3 is a sequence diagram illustrating an example of processing performed in a case where APs 102 and 103 establish a plurality of backhaul links.

FIG. 3 is a sequence diagram illustrating an example of processing performed in a case where the APs 102 and 103 establish a plurality of backhaul links.

According to the present exemplary embodiment, the AP 102 as a backhaul STA connects with the network 106 configured by the AP 101 to establish a backhaul link. Then, the AP 102 is registered as an agent in the AP 101. Thus, the MAP network 111 including the APs 101 and 102 is configured. To join the MAP network 111, the AP 103 connects with the network 107 configured by the AP 102, to establish a backhaul link with the AP 102. When the AP 103 establishes a backhaul link with the AP 102, the AP 103 is registered as an agent in the AP 101 via the AP 102. Then, a second backhaul link is established between the APs 102 and 103 via the network 108. The above-described sequence will be described below with reference to the sequence diagram illustrated in FIG. 3.

This sequence is started in a state where the AP 102 has joined, as a backhaul STA, the network 106 configured by the AP 101. When the AP 102 joins the network 106, then in step F301, the AP 102 transmits an AP-Autoconfiguration Search message of IEEE 1905.1 on a multicast basis as a search signal (search message) for searching for the controller.

In a case where the AP 101 operates as the controller when receiving the search signal transmitted from the AP 102, then in step F302, the AP 101 transmits an AP-Autoconfiguration Response message as a response signal to the AP 102.

In a case where the AP 102 receives the response signal, then in step F303, the AP 102 transmits an AP-Autoconfiguration WSC message to the AP 101 as a registration request signal for registering the AP 102 in the AP 101 (controller). This message includes a message corresponding to an M1 message conforming to the Wi-Fi Simple Configuration (WSC) standard. More specifically, this message includes information such as the MAC address and the device name of the AP 102. In addition, the registration request signal includes wireless communication capability information for the AP 102. More specifically, the wireless communication capability information includes information about the frequency bands (at least either one of the 2.4 and 5 GHz bands) available for the AP 102 and information about the frequency channels available for the AP 102. In addition to or instead of these pieces of information, the wireless communication capability information may include an identifier for uniquely identifying the network 106 joined by the AP 102, in the MAP network 111.

The registration request signal may be expanded to include information about a wireless I/F capable of operating as a backhaul STA included in the AP 102. More specifically, the information about the wireless I/F is the MAC address of the wireless I/F. The registration request signal may also be expanded to include information about a BSS network that can be joined by other APs among front-haul BSS networks that can be configured by the AP 102. More specifically, the information about a BSS network that can be joined by other APs is the Basic Service Set Identifier (BSSID) of the BSS network. The information about a BSS network that can be joined by other APs may include information about whether the BSS network has been configured or not. The registration request signal may be further expanded to include capability information about whether the AP 102 can establish a plurality of backhaul links at the same time.

After receiving the registration request signal, then in step F304, the AP 101 transmits an AP-Autoconfiguration WSC message as a registration response signal to the AP 102. In a case where the registration of an agent is successful in the AP 101, the registration response signal includes a message corresponding to an M2 message of WSC. In this case, the registration response signal includes the device name of the AP 101 and information indicating that no error occurred. The registration response signal also includes an identifier for uniquely identifying the network 106 in the MAP network 111. The identifier included in the registration response signal may be the same as the identifier included in the registration request signal. In a case where an error occurs and the registration of the AP 102 fails in the AP 101, the AP 101 transmits a registration response signal indicating the error occurrence.

The AP 102 may issue to the user a notification according to the registration response signal received from the AP 101 in step F304. For example, when the AP 102 receives a registration response signal including information indicating that no error has occurred, the AP 102 notifies the user that the registration is successfully completed. Alternatively, the AP 102 may notify the user that the AP 102 has joined the MAP network 111. Meanwhile, in a case where the AP 102 receives a registration response signal including information indicating that an error has occurred, the AP 102 notifies the user that the registration has failed. Alternatively, the AP 102 may notify the user that the AP 102 fails to join the MAP network 111. In a case where the registration response signal includes information indicating the cause of the error, the AP 102 may notify the user of the cause of the error.

Although, in the present exemplary embodiment, the registration request signal transmitted from the AP 102 includes the information about the wireless I/F of the AP 102 and the information about a BSS network that can be joined by other APs, the present invention is not limited thereto. After completion of the processing in up to step F304, the AP 101 may transmit a query message for making an inquiry to the AP 102 about these pieces of information and then receive a response message as a response to the query to obtain these pieces of information from the AP 102. Likewise, the AP 101 may also obtain capability information about whether the AP 102 can establish a plurality of backhaul links at the same time, by transmitting a query message and then receiving a response message as a response to the query.

Alternatively, in a case where there is a version that supports the establishment of a plurality of backhaul links among a plurality of versions of the Wi-Fi EasyMesh standard, the AP 101 may make an inquiry to the AP 102 about the version of the standard supported by the AP 102. In this case, the AP 101 can determine whether the AP 102 can establish a plurality of backhaul links based on the version of the Wi-Fi EasyMesh standard supported by the AP 102.

As a result of the above-described processing, the AP 102 is registered as an agent of the MAP network 111, in the AP 101 (controller). The AP 101 can also obtain information about the wireless I/F of the AP 102 and a BSS network that can be joined by other APs, and information about the capability of the AP 102 for establishing a plurality of backhaul links.

Subsequently, a backhaul link is established between the APs 102 and 103. In this case, processing for establishing the layer 2 (data link layer) of the Open Systems Interconnection (OSI) reference model between agents is referred to as onboarding processing. In this case, the AP 103 can be added to the MAP network 111 in a case where the onboarding processing is performed between the APs 102 and 103.

In the flowchart illustrated in FIG. 3, the onboarding processing based on a method conforming to the WPS standard is performed.

To start the onboarding processing by the APs 102 and 103, the user presses a button provided on each of the APs 102 and 103. This button may be the same button that is used for processing for setting the communication parameters based on the Push Button Configuration (PBC) method conforming to the WPS standard.

In a case where the user presses this button on the APs 102 and 103, the onboarding processing based on a method conforming to the WPS standard is started. Firstly, the AP 102 transmits a Beacon including information indicating that the WPS processing has been started. By receiving the Beacon transmitted by the AP 102, the AP 103 detects the AP 102 as an AP that is performing the WPS. Alternatively, the AP 103 may detect the AP 102 by transmitting a Probe Request and receiving a Probe Response in response to the request, from the AP 102.

In a case where the AP 103 detects the AP 102 as an AP that performs the WPS, then in step F305, the AP 101 transmits an Association Request to the AP 102. In this operation, the AP 101 adds a Multi-AP Information Element (MAP IE) to the Association Request and performs the transmission. The MAP IE is information element conforming to the Wi-Fi EasyMesh standard and includes information indicating that the AP 103 has transmitted the Association Request as a backhaul STA.

When the AP 102 receives the Association Request from the AP 103, then in step F306, the AP 102 transmits an Association Response to the AP 103 as a response to the request. The Association Response also includes the MAP IE. The MAP IE transmitted by the AP 102 includes information indicating that the connection target network 107 is a BSS network to which other APs can connect.

The APs 102 and 103 may include information indicating whether the APs 102 and 103 can establish a plurality of backhaul links on its own to each of an Association Response and an Association Request and transmit the Association Response and Association Request.

In a case where the AP 103 receives the Association Response, then in step F307, the AP 103 performs WPS processing with the AP 102 and shares the communication parameters for the front-haul BSS network of the AP 102, which can be joined by the AP 103. According to the present exemplary embodiment, the AP 102 provides the AP 103 with the communication parameters for the networks 107 and 108 as the communication parameters for the front-haul BSS network of the AP 102, which can be joined by the AP 103. The frame of the wireless LAN transmitted and received in the WPS processing includes the MAP IE. From the standpoint of the AP 103, the network 107 is referred to as a backhaul BSS network.

In a case where the AP 103 shares the communication parameter with the AP 102 by the WPS processing, the communication link between the APs 102 and 103 is once disconnected. Then, in step F308, the AP 103 transmits an Association Request to the AP 102 by using the communication parameters for the front-haul BSS network of the AP 102 obtained through the WPS processing.

In this case, which of the networks 107 and 108 the AP 103 joins is determined according to the result of scan processing. More specifically, the AP 103 performs the scan processing in the frequency channels that is used by the networks 107 and 108 and determines which network has already been configured. As a result of the scan processing, the AP 103 joins the network that has already been configured. In a case where the networks have already been configured, the AP 103 joins the network detected earlier or the network selected by the user. Alternatively, the AP 103 determines the network based on the frequency band being used by the network. In this case, which of the 2.4 GHz network and the 5 GHz network is to be preferentially selected may be determined by the user or preset by the AP 103. According to the present exemplary embodiment, the AP 103 joins the network 107.

In a case where the AP 102 receives the Association Request from the AP 103, then in step F309, the AP 102 transmits an Association Response to the AP 103 as a response to the request. The MAP IE is added to each of the Association Request and the Association Response before the transmission. As a result of the above-described processing, a backhaul link is established between the APs 102 and 103. Then, processing for encrypting the backhaul link is performed by 4way-Handhake as required.

Then, the AP 103 registers the agent AP 103 in the AP 101 (controller). More specifically, the AP 103 searches for the controller and transmits a registration request. Processing in steps F310 to F313 is similar to the processing in steps F301 to F304, and redundant descriptions thereof will be omitted. The AP 101 can also obtain the information about the wireless I/F of the AP 103 and a BSS network that can be joined by other APs, and information about the capability of the AP 103 for establishing a plurality of backhaul links.

In step F314, by establishing a new backhaul link, the AP 103 performs processing for determining whether to establish a plurality of backhaul links with the AP 102. This determination processing will be described in detail below with reference to FIG. 5. In this case, the AP 103 determines to establish a plurality of backhaul links with the AP 102.

In a case where the AP 103 establishes a new backhaul link with the AP 102, in step F315, the AP 103 transmits an Association Request to the AP 102 to join the network 108 of the AP 102. The communication parameters in step F315 are communication parameters that are for joining the network 108 and have been obtained from the AP 102 in the WPS processing in step F307. The AP 103 may transmit an Association Request including information about a request for establishing a plurality of backhaul links.

In a case where the AP 102 receives the Association Request, then in step F316, the AP 102 transmits an Association Response to the AP 103 as a response to the request. In a case where the AP 102 receives the Association Request including the information about a request for establishing a plurality of backhaul links from the AP 103, the AP 102 may determine whether to establish a plurality of backhaul links with the AP 103. In this operation, in a case where the AP 102 determines to establish a plurality of backhaul links with the AP 103, the AP 102 transmits an Association Response to the AP 103. Meanwhile, in a case where the AP 102 determines not to establish a plurality of backhaul links with the AP 103, the AP 102 does not transmit an Association Response to the AP 103. Alternatively, the AP 102 transmits an Association Response or a response message including information about connection impossibility, error, or failure.

When the AP 102 transmits an Association Request, the AP 103 joins the network 108 of the AP 102 and establishes a second backhaul link with the AP 102.

After establishment of a new backhaul link, in step F317 and F319, the APs 102 and 103 transmit backhaul establishment messages to the AP 101, respectively. The backhaul link establishment message is a message indicating that the establishment of a new backhaul link is completed. The backhaul establishment message includes information about the newly established backhaul link. More specifically, information about the newly established backhaul link includes information about the network in which the new backhaul link is established. In this case, the message includes information about the network 108. Examples of the information about the network 108 may include the BSSID of the network 108 and the frequency bands and the frequency channels of the network 108. The information about the network 108 may also include the SSID of the AP 102 configuring the network 108. In addition to or instead of the information about the network, information about the backhaul STA may be included as information about the backhaul link. Examples of the information about the backhaul STA may include the MAC address of the wireless I/F of the backhaul STA of the AP 103. Alternatively, in addition to or instead of these pieces of information, the identifier for uniquely identifying the backhaul link in the MAP network 111 may be included as the information about the backhaul link. The backhaul establishment message transmitted by the APs 102 and 103 may include the same information or include these pieces of information in a distributed way.

After receiving the backhaul establishment messages, then in steps F318 and F320, the AP 101 transmits a backhaul establishment confirmation message to each of the APs 102 and 103, as a response to the respective backhaul establishment message. The backhaul establishment confirmation message may include the identifier of the backhaul link included in the backhaul establishment message. By using this identifier, the AP 101 identifies and controls the target backhaul link.

Although, in the present exemplary embodiment, each of the APs 102 and 103 transmits a backhaul establishment message, the present invention is not limited thereto. Only either one of the APs 102 and 103 may transmit the message. In this case, the AP 101 transmits the backhaul establishment confirmation message only to the AP that has transmitted the backhaul establishment message. In a case where at least either one of the APs 102 and 103 operates as the controller, the backhaul establishment message is not transmitted. In this case, since one apparatus that has established a plurality of backhaul links operates as the controller, it is not necessary to notify again the controller of the establishment of the plurality of backhaul links.

According to the present exemplary embodiment, each message in steps F317 to F320 is transmitted in a format conforming to the IEEE 1905.1 standard. However, the present invention is not limited thereto. The message may be transmitted in a format conforming to other standards.

In the sequence illustrated in FIG. 3, in a case where a plurality of backhaul links is established between agents, the agents notify the controller of the establishment of the plurality of backhaul links. This enables the controller to recognize the backhaul links established between agents in the MAP network, and therefore controlling the MAP network including the backhaul links can be performed.

While, referring to FIG. 3, the APs 102 and 103 perform processing for sharing the communication parameters by the WPS method only in a case where a backhaul link is established for the first time, the present invention is not limited thereto. The APs 102 and 103 may perform processing for sharing the communication parameters by the WPS method each time when a backhaul link is established.

Figure 4:
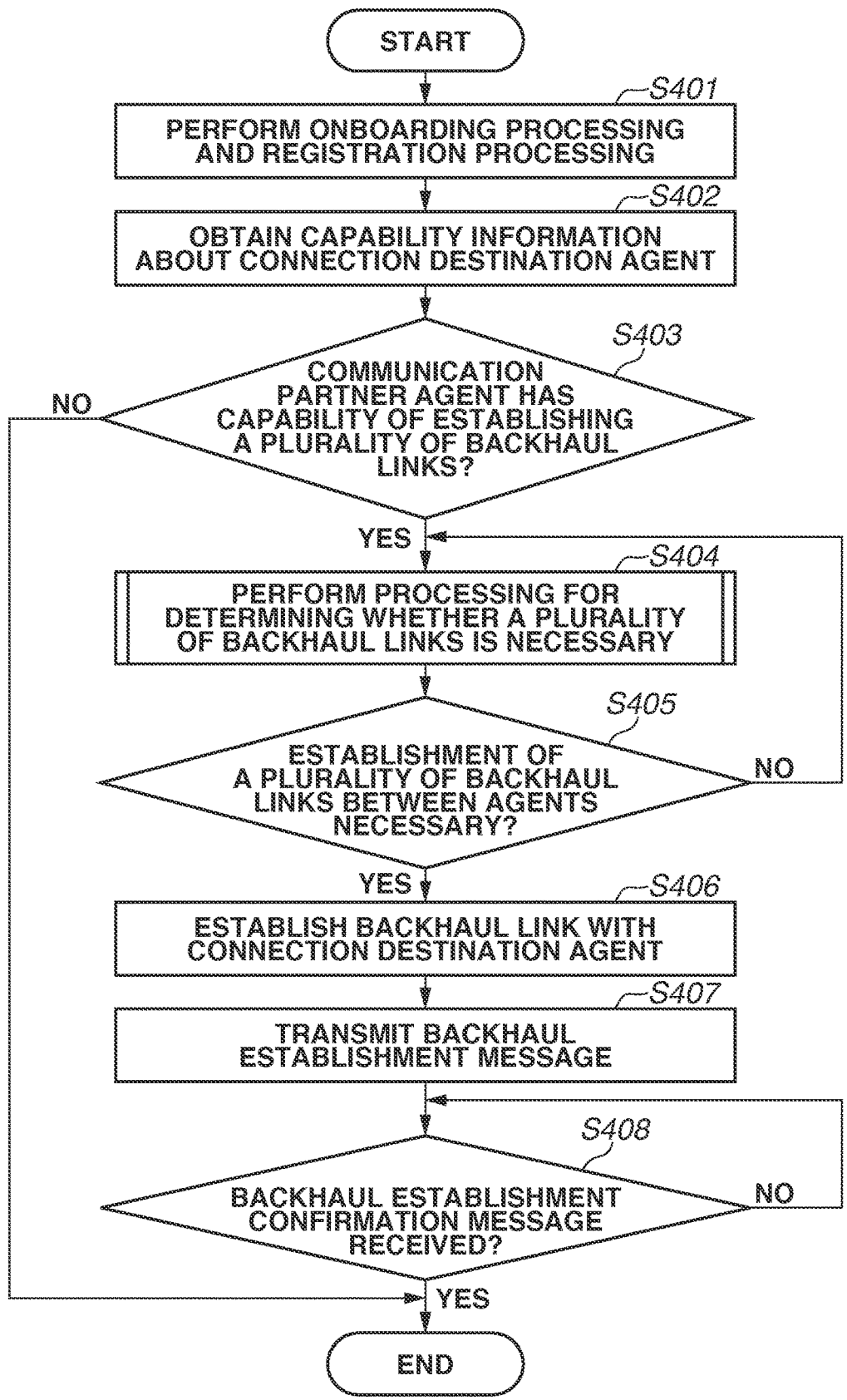
FIG. 4 is a flowchart illustrating an example of processing performed by the AP 103 to establish a plurality of backhaul links with the AP 102.

FIG. 4 is a flowchart illustrating processing that is performed when the control unit 207 reads a computer program stored in the storage unit 206 and executes the program in a case where the AP 103 establishes a plurality of backhaul links with the AP 102.

The AP 103 starts the processing of this flowchart in a case where the user presses a button. The button refers to the button pressed by the user before step F305 illustrated in FIG. 3. Alternatively, the AP 103 may start the processing of this flowchart in a case where the user instructs the AP 103 to establish a backhaul link via other input units, instead of the button. Alternatively, the AP 103 may start the processing of the flowchart in accordance with a request from an application operating on the AP 103.

In step S401, the AP 103 first performs the onboarding processing and registration processing. The onboarding processing is performed between the APs 102 and 103, and is the processing in steps F305 to F309 illustrated in FIG. 3. By the onboarding processing, a first backhaul link is established between the AP 103 and AP 102. The registration processing is performed between the AP 101 (controller) and the AP 103, and is the processing in steps F310 to F313 illustrated in FIG. 3. By the registration processing, the AP 103 is registered as an agent in the MAP network 111, in the AP 101 (controller).

In step S402, the AP 103 obtains the capability information about the connection destination agent (AP 102). The capability information obtained in step S402 is capability information indicating whether the AP 102 can establish a plurality of backhaul links at the same time. In addition to or instead of the capability information, the AP 103 may obtain the wireless communication capability information. The wireless communication capability information is information about the frequency bands (at least either one of the 2.4 and 5 GHz bands) available for the AP 102 and information about the frequency channels available for the AP 102. In addition to or instead of these pieces of capability information, the AP 103 may obtain information about the wireless I/F capable of operating as a backhaul STA included in the AP 102 and information about a BSS network that can be configured by the AP 102 and joined by other APs. The AP 103 may obtain these pieces of information based on the signal received from the AP 102 in step S401 or based on the signal received from the AP 102 in step S402. Alternatively, the AP 103 may transmit a query message for making an inquiry to the AP 102 about these pieces of information and then obtain these pieces of information from the response message. The query message and the response message are transmitted and received via the backhaul link established between the APs 102 and 103. These pieces of information may be indicated by the MAP IE included in the signal (message) transmitted from the AP 102.

Alternatively, the AP 103 may obtain these pieces of information about the AP 102 from the AP 101 (controller). Since the AP 101 operating as the controller manages the information about the AP 102 (agent) in the MAP network 111, the AP 103 can obtain the information about the AP 102 from the AP 101.

Although, in the present exemplary embodiment, the AP 103 obtains a plurality of communication parameters for connecting with a BSS network, which can be joined by other APs, from the AP 102 in step S401, the present invention is not limited thereto. The AP 103 may obtain the communication parameters in step S402. More specifically, the AP 103 obtains the communication parameters for joining the network 107 in step S401 and then obtains the communication parameters for joining the network 108 via an established backhaul link. In this case, the AP 103 transmits a request message for requesting the AP 102 for the communication parameters to the AP 102 via the backhaul link established with the AP 102 and obtains the communication parameters for joining the network 108 as a response to the request message. The present invention is not limited to a case where the AP 103 issues a request. The AP 102 may simply transmit the communication parameters for joining the network 108 to the AP 103 via the backhaul link. The above-described processing for obtaining the communication parameters may be performed not in step S402 but before step S406 is performed in a case where a result of the determination is "YES" in step S405.

In step S403, the AP 103 determines whether the connection destination agent (AP 103) has the capability of establishing a plurality of backhaul links. In this step, the AP 103 performs the determination based on the information about the AP 102 obtained in step S402. In a case where the AP 103 obtains information indicating that a plurality of backhaul links cannot be established from the AP 102 in step S402, a result of the determination is "NO" in step S403. Meanwhile, in a case where the AP 103 obtains information indicating that a plurality of backhaul links can be established from the AP 102 in step S402, a result of the determination is "YES" in step S403. Alternatively, the present invention is not limited thereto. In a case where the AP 103 obtains in step S402 the information about a BSS network that can be configured by the AP 102 and joined by other APs, the AP 103 may perform the determination in step S403 according to whether a BSS network, which has been built and is different from the BSS network that has already been joined by the AP 103. According to the present exemplary embodiment, the AP 103 determines whether the AP 102 has configured the network 108. More specifically, the AP 103 performs the scan processing, and in a case where the BSS network is detected, a result of the determination is "YES" in step S403, or in a case where the BSS network is not detected, a result of the determination is "NO" in step S403. In this case, the AP 103 performs the scan processing using a wireless I/F different from the wireless I/F that has already established a backhaul link with the AP 102. In a case where the AP 103 has obtained information about the frequency channels to be used by a BSS network that can be configured by the AP 102 and joined by other APs, the AP 103 may perform the scan processing only for the relevant frequency channel or for all channels.

The AP 103 may perform the determination in step S403 based on information about not only the connection destination agent but also information about the AP 103. In a case where the AP 103 does not have the capability of establishing a plurality of backhaul links or in a case where the user disables the establishment of a plurality of backhaul links, a result of the determination is "NO" in step S403. Alternatively, in this case, the AP 103 may end the flowchart without performing the processing in step S402 and subsequent steps.

In a case where a result of the determination is "NO" in step S403, the processing exits the flowchart. Meanwhile, in a case where a result of the determination is "YES" in step S403, the processing proceeds to step S404.

Figure 5:
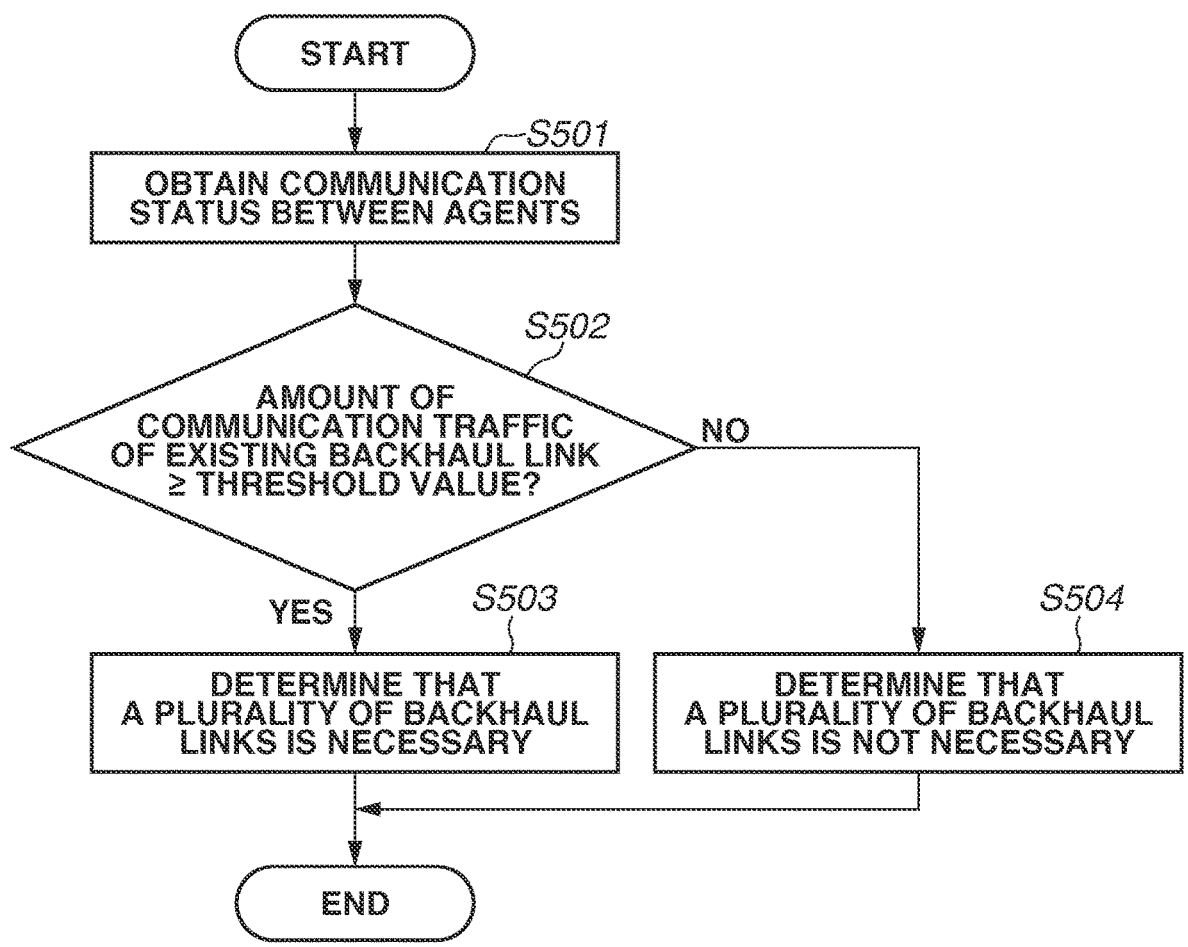
FIG. 5 is a flowchart illustrating an example of processing performed by the AP 103 to determine whether to establish a plurality of backhaul links with the AP 102.

In step S404, the AP 103 performs determination processing for determining whether a plurality of backhaul links with the AP 102 is necessary. The determination processing is illustrated in FIG. 5.

In step S501, the AP 103 obtains the communication status of the backhaul link between the AP 103 and the connection destination agent (AP 102). According to the present exemplary embodiment, the AP 103 obtains a link metrics for the backhaul link between the APs 102 and 103. More specifically, the AP 103 obtains as a link metrics the capability information about the throughput of at least either one of the APs 102 and 103, and information about the physical rate and an amount of communication traffic of the target backhaul link. According to the present exemplary embodiment, the AP 103 obtains, as a link metrics, the link use rate that is information about an amount of communication traffic of the backhaul link. The AP 103 determines that an amount of communication traffic of the backhaul link is large in a case where the link use rate of the backhaul link is high, and determines that an amount of communication traffic of the backhaul link is small in a case where the link use rate is low. In step S501, the AP 103 may also obtain the Received Signal Strength Indicator (RSSI) of at least either one of the APs 102 and 103 and the electric wave status indicated by the frequency channel status. The RSSI indicates the received signal intensity.

In step S502, the AP 101 determines whether an amount of communication traffic (link use rate) of the target backhaul link is equal to or larger than a predetermined threshold value. In this step, based on the communication status between agents obtained by the AP 101 in step S501, the AP 103 determines whether the establishment of a plurality of backhaul links between the agents is necessary. According to the present exemplary embodiment, since the AP 103 has obtained the amount of communication traffic (link use rate) of the backhaul link between the APs 102 and 103 as the communication status, the AP 103 performs the determination in step S502 based on the amount of communication traffic (link use rate). In a case where the amount of communication traffic (link use rate) obtained in step S501 is equal to or larger than the threshold value (YES in step S502), the processing proceeds to step S503. Meanwhile, in a case where the amount of communication traffic (link use rate) obtained in step S501 is less than the predetermined threshold (NO in step S502), the processing proceeds to step S504. The threshold value that is used in this determination may be preset in the AP 103, or calculated from the link metrics of the entire MAP network 111 and set by the AP 101. Alternatively, the threshold value may be set by the user.

In step S503, the AP 103 determines that a plurality of backhaul links is necessary. More specifically, the AP 103 stores information indicating that a plurality of backhaul links is necessary between the APs 102 and 103. Meanwhile, in step S504, the AP 103 determines that a plurality of backhaul links is not necessary. More specifically, the AP 103 stores information indicating that a plurality of backhaul links is not necessary between the APs 102 and 103. After the AP 103 completes the processing in step S503 or S504, the processing exits the flowchart.

While, in the present exemplary embodiment, the AP 101 performs the determination based on an amount of communication traffic, the present invention is not limited thereto. Ina case where the AP 101 obtains the physical rate of the target backhaul link as the communication status in step S501, then in step S502, the AP 101 may perform the determination based on the physical rate. In this case, in step S502, the AP 101 determines whether the physical rate is less than a predetermined threshold value. Alternatively, in a case where the AP 101 obtains the capability information about the throughput of at least either one of the APs 102 and 103 as the communication status in step S501, then in step S502, the AP 101 may perform the determination based on the throughput. In this case, in step S502, the AP 101 determines whether the throughput is less than the predetermined threshold value.

The determination processing illustrated in FIG. 5 is to be considered as illustrative and is not limited thereto. While, in the present exemplary embodiment, the AP 101 performs the determination based on the communication status with the target agent and the communication status of the entire MAP network, the present invention is not limited thereto. The AP 101 may determine whether a plurality of backhaul links is necessary, based on a selection by the user. In this case, the processing in steps S501 and S502 may be omitted. For example, in a case where the establishment of a plurality of backhaul links in the MAP network 111 is enabled by the user, the AP 103 performs the processing in step S503. Meanwhile, in a case where the establishment of a plurality of backhaul links in the MAP network 111 is disabled by the user, the AP 103 performs the processing in step S504. Alternatively, whether to permit the establishment of a plurality of backhaul links between certain agents may be set by user. The setting by the user may be performed via an STA connected with the AP 103 via a wired LAN or a wireless LAN, or performed via the input unit of the AP 103. Alternatively, the user setting may be performed via other apparatuses connected via an external network which the AP 101 connects with, or performed via a STA taking part in a network in the MAP network 111.

Alternatively, the AP 103 may perform the determination in step S502 based on the electric wave status of an existing backhaul link. More specifically, in a case where at least either one of the RSSI of the AP 102 and the RSSI of the AP 103 is lower than a predetermined threshold value, the AP 103 performs the processing in step S503 to establish a plurality of backhaul links between the APs 102 and 103. Meanwhile, in a case where the RSSIs are higher than the predetermined threshold value, the AP 103 performs the processing in step S504. In case where the RSSI of an existing backhaul link between the APs 102 and 103 is low, the AP 103 can establish a backhaul link as a backup link by establishing a plurality of backhaul links.

The descriptions of FIG. 4 will be resumed. In step S405, the AP 103 determines whether the establishment of a plurality of backhaul links with the AP 102 is necessary. The AP 103 performs the determination based on the result of the determination in step S404. More specifically, a result of the determination is "YES" in step S405 in a case where the AP 103 performs the processing in step S503 illustrated in FIG. 5, or a result of the determination is "NO" in step S405 in a case where the AP 103 performs the processing in step S504 illustrated in FIG. 5. In a case where a result of the determination in step S405 is "NO", the processing returns to step S404. In a case of setting the timer, and in a case where a result of the determination in step S405 is not "YES" from when a result of the determination in step S405 is "NO" for the first time until a predetermined time period has elapsed, the processing may exit the flowchart. Alternatively, in a case where a result of the determination in step S405 is "NO" for a predetermined number of times, the processing may exit the flowchart. Meanwhile, in a case where a result of the determination in step S405 is "YES", the processing proceeds to step S406.

In step S406, the AP 103 performs processing for establishing a backhaul link with the target agent (AP 102). In this step, the AP 103 performs the processing in steps F315 and F316 illustrated in FIG. 3. The AP 103 performs the processing to establish a second backhaul link with the AP 102. In a case where the AP 103 fails in processing for connecting with the target BSS network (network 108) via a wireless LAN in step S406, the AP 103 may end the processing for establishing a backhaul link. In this case, the processing exits the flowchart. The AP 103 also notifies the user that the establishment of a plurality of backhaul links with the AP 102 has failed. In this case, in addition to or instead of the AP 103, the AP 102 may notify the user that the establishment of a plurality of backhaul links has failed. After the AP 103 establishes a backhaul link with the AP 102, the AP 103 performs the processing in step S407.

In step S407, the AP 103 transmits a backhaul establishment message for notifying the AP 101 (controller) of the establishment of a new backhaul link. In this step, the AP 103 performs processing equivalent to step F319 illustrated in FIG. 3.

In step S408, the AP 103 determines whether a backhaul establishment confirmation message is received from the AP 101 (controller). The backhaul establishment confirmation message received by the AP 103 in this step is the message indicated in step F320 illustrated in FIG. 3. The backhaul establishment confirmation message may include the identifier for identifying the backhaul link established in step S406. In a case where the AP 103 does not receive the backhaul establishment confirmation message (NO in step S408), the processing returns to step S408. Meanwhile, in a case where the AP 103 receives the backhaul establishment confirmation message (YES in step S408), the processing exits the flowchart. In a case where the AP 103 does not receive a backhaul establishment confirmation message from when a backhaul establishment message is transmitted in step S407 until a predetermined time has elapsed, the processing may exit the flowchart. In addition, step S408 may be omitted.

FIG. 4 illustrates processing performed by the AP 103 to establish a plurality of backhaul links. After the AP 103 establishes a second backhaul link with the AP 102, the AP 103 notifies the AP 101 (controller) of the establishment of a new backhaul link to enable the AP 101 to control the backhaul link.

Processing performed by the AP 102 in a case where the APs 102 and 103 establish a plurality of backhaul links will also be described below with reference to FIG. 4.

In step S401, the AP 102 performs the onboarding processing. In this step, the AP 102 provides the AP 103 with the communication parameters for joining the networks 107 and 108. The AP 102 establishes a backhaul link with the AP 103 in the network 107. Since the AP 102 has already been registered as an agent in the AP 101, the registration processing in this step is not necessary.

In step S402, the AP 102 obtains the capability information about the connection target agent (AP 103). The AP 102 obtains the capability information about the AP 103 by performing similar processing to the processing of the AP 103. This step may be omitted. The AP 102 skips the processing in step S403 and performs the processing in step S406.

In step S406, the AP 102 establishes a backhaul link with the connection target agent (AP 103). The processing in this step is as described in steps F315 and F316 illustrated in FIG. 3.

After the AP 102 establishes a backhaul link, then in step S407, the AP 102 transmits a backhaul establishment message. The message transmitted in this step is the message described in step F317 illustrated in FIG. 3. The processing of this step is similar to the processing of the AP 103 in step S407.

In step S408, the AP 102 checks whether a backhaul establishment confirmation message is received from the AP 101. The message transmitted in this step is the message described in step F318 illustrated in FIG. 3. The processing in this step is similar to the processing of the AP 103 in step S408.

The AP 102 may establish the network 108 to be used for the establishment of a new backhaul link before the flowchart is started or in a predetermined step before step S406.

Although, in the present exemplary embodiment, the AP 103 determines whether the establishment of a plurality of backhaul links is necessary, the present invention is not limited thereto. The determination may be performed by the AP 102. In this case, the AP 102 performs the processing in step S402, but the AP 103 does not need to perform the processing in step S402. In a case where the AP 102 determines that the establishment of a plurality of backhaul links is necessary, the AP 102 transmits to the AP 103 a message for instructing the AP 103 to transmit an Association Request. Alternatively, the AP 102 may transmit to the AP 103 a request message for requesting the AP 103 to establish a plurality of backhaul links. After the AP 103 receives the request message, the AP 103 transmits an Association Request to the AP 102.

Alternatively, both the APs 102 and 103 may determine whether the establishment of a plurality of backhaul links is necessary. In a case where the AP 102 performs the determination earlier and determines that the establishment of a plurality of backhaul links is necessary, the AP 102 transmits to the AP 103 a message for instructing the AP 103 to transmit an Association Request. Alternatively, the AP 102 transmits to the AP 103 a request message for requesting the AP 103 to establish a plurality of backhaul links. After the AP 103 receives these messages, the AP 103 may determine whether the establishment of a plurality of backhaul links is necessary, and perform processing according to the result of the determination. More specifically, in a case where the AP 103 also determines that the establishment of a plurality of backhaul links is necessary, the AP 103 transmits an Association Request to the AP 102. Alternatively, in addition to the Association Request, the AP 102 may transmit to the AP 103 a response message as a response to the request message prior to the Association Request. In this case, the AP 103 may include "OK" information or information indicating that a plurality of backhaul links is to be established in the response message. Meanwhile, in a case where the AP 103 determines that the establishment of a plurality of backhaul links is not necessary, the AP 103 may not transmit an Association Request or response message to the AP 102. Alternatively, the AP 103 may transmit to the AP 102 a response message including "NG" information or information indicating that a plurality of backhaul links is not to be established. The AP 103 may perform the determination earlier than the AP 102.

Figure 6:
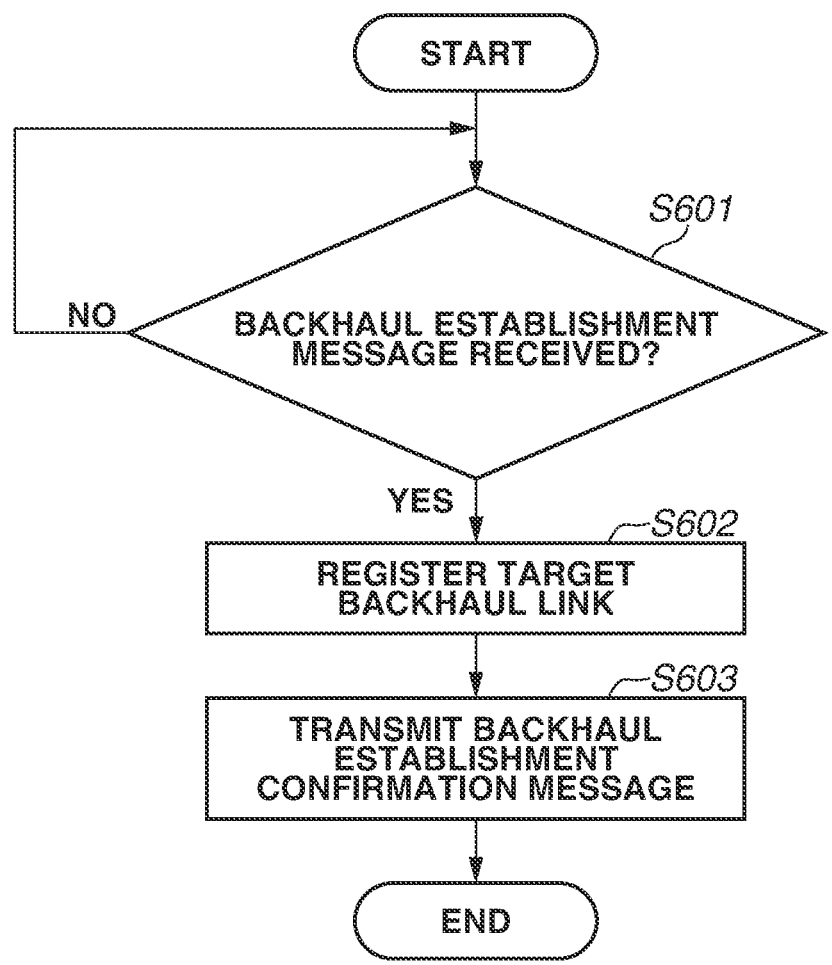
FIG. 6 is a flowchart illustrating an example of processing performed by the AP 101 in a case where a plurality of backhaul links is established between the APs 102 and 103.

FIG. 6 is a flowchart illustrating processing performed in a case where a plurality of backhaul links is established between the APs 102 and 103. This processing is implemented when the control unit 207 reads a computer program stored in the storage unit 206 of the AP 101 and executes the program.

The AP 101 starts the flowchart in a case where a new agent is registered in the MAP network 111. Alternatively, the flowchart may be started by a user operation.

In step S601, the AP 101 determines whether a backhaul establishment message is received from an agent (at least either one of the APs 102 and 103). The message received in this step is the message indicated in steps F317 and F319 illustrated in FIG. 3. In a case where the backhaul establishment message is not received (NO in step S601), the AP 101 performs the processing in step S601 again. Ina case where the AP 101 does not receive the backhaul establishment message from when the processing procedure of the flowchart has been started until a predetermined time period has elapsed, the processing may exit the flowchart. Meanwhile, in a case where the backhaul establishment message is received (YES in step S601), the processing proceeds to step S602.

In step S602, the AP 101 performs registration processing for registering a new backhaul link. More specifically, based on information included in the backhaul establishment message received in step S601, the AP 101 registers information about the newly established backhaul link between the APs 102 and 103, in the AP 101. The information registered in this case is at least part of the information included in the received backhaul establishment message. In a case where the received backhaul establishment message includes the identifier for uniquely identifying the newly established backhaul link in the MAP network 111, the AP 101 stores the identifier. In a case where the identifier is not included in the backhaul establishment message or is duplicated with the identifiers of other backhaul links, the AP 101 generates an identifier of the newly established backhaul link and stores the identifier. The generated identifier may be included in the backhaul establishment confirmation message transmitted in step S603 (described below).

In step S603, the AP 101 transmits a backhaul establishment confirmation message. The message transmitted in step S603 is the message described in steps F318 and F320 illustrated in FIG. 3. The AP 101 may transmit a backhaul establishment confirmation message only to the agent as the transmission source of the backhaul establishment message received in step S601. Alternatively, this step may be omitted. After the AP 101 performs the processing in step S603, the processing exits the flowchart.

FIG. 6 illustrates the processing performed by the AP 101 in a case where the APs 102 and 103 establish a new backhaul link. In a case where a second backhaul link is established between the APs 102 and 103 already been registered as agents in the MAP network 111, the AP 101 can also recognize the backhaul link by receiving the notification. This enables the AP 101 to control the MAP network 111 including the new backhaul link established between the APs 102 and 103, and consequently the AP 101 can transmit control instructions for the newly established backhaul link.

Examples of control instructions that are transmitted by the AP 101 (controller) include a query message for obtaining an amount of communication traffic of the target backhaul link. Alternatively, as control instructions, the AP 101 can issue an instruction for changing the frequency channel of the target backhaul link and an instruction for changing the frequency band to be used. The AP 101 can also issue an instruction for ending the target backhaul link. In addition, the AP 101 can issue an instruction for controlling the data traffic via the target backhaul link and an instruction for performing network diagnosis for the target backhaul link. As data traffic control, the AP 101 may issue an instruction for performing distributed control by distributed data communication via a plurality of backhaul links including the target backhaul link. The AP 101 may perform switching control for selecting which of a backhaul link is to be used for data communication, according to the statuses of the backhaul links between the APs 102 and 103.

Figure 7:
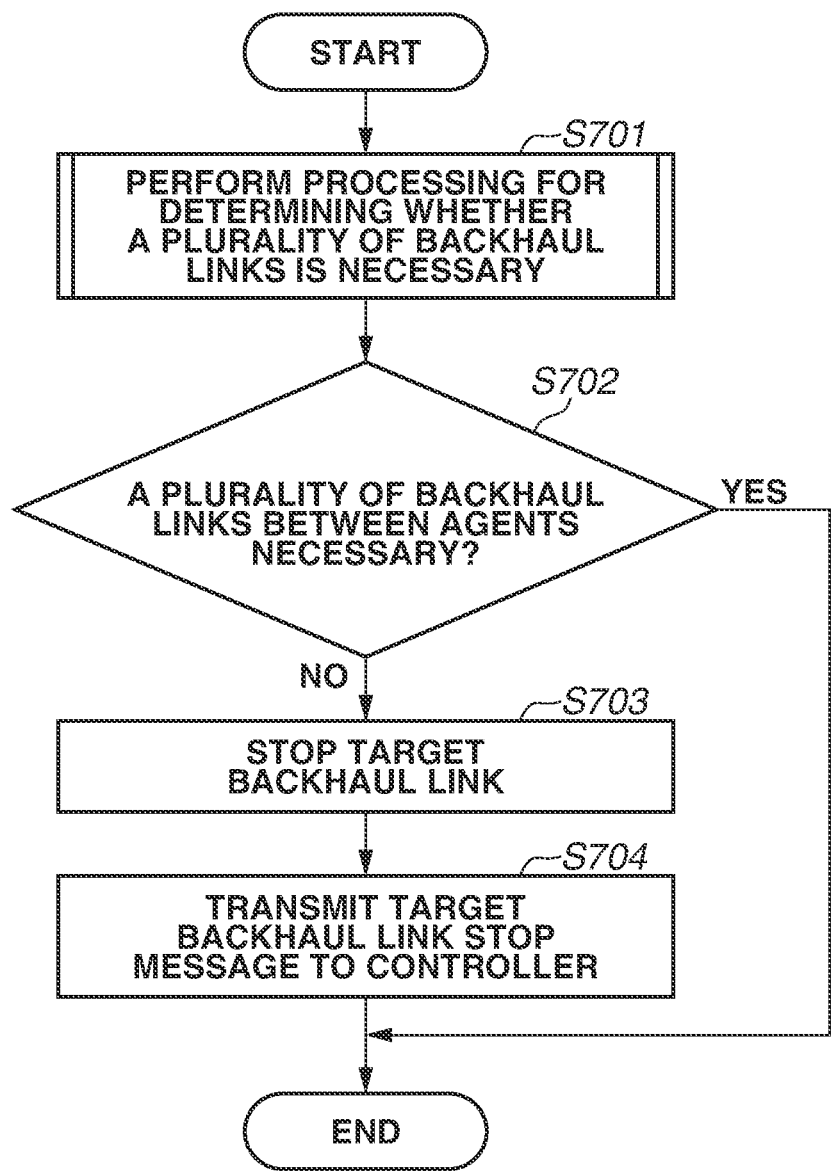
FIG. 7 is a flowchart illustrating an example of processing performed by the AP 103 to stop a predetermined backhaul among the plurality of backhaul links established with the AP 102.

FIG. 7 is a flowchart illustrating processing performed in a case where a predetermined backhaul link established between the APs 102 and 103 is to be stopped. The processing is implemented when the control unit 207 reads a computer program stored in the storage unit 206 and executes the program. The processing of the flowchart may be performed not by the AP 103 but by the AP 102.

The flowchart is started after a plurality of backhaul links is established with the AP 102. Alternatively, the flowchart may be started by an instruction from the user.

In step S701, the AP 103 performs processing for determining whether the plurality of backhaul links with AP 102 is necessary. The processing in step S701 is similar to the processing illustrated in FIG. 5. In this case, the processing in step S501 illustrated in FIG. 5 may be omitted. In step S502, the AP 103 determines whether an amount of communication traffic (link use rate) of each of the plurality of backhaul links established with AP 102 is less than a predetermined threshold value. The threshold value used in this step is smaller than the threshold value of the determination in step S404 illustrated in FIG. 4. In a case where an amount of communication traffic (link use rate) of any one of the plurality of backhaul links is less than the predetermined threshold value, the AP 103 determines that the plurality of backhaul links is not necessary. Meanwhile, in a case where an amount of communication traffic (link use rate) of each of the plurality of backhaul links is equal to or larger than the predetermined threshold value, the AP 103 determines that the plurality of backhaul links is necessary.

Alternatively, in a case where the plurality of backhaul links has been established between agents to back up the backhaul links, the AP 103 may perform the determination based on the electric wave status of the backhaul link used for the main application. More specifically, in a case where the RSSI in the backhaul link which is used for the main application is equal to or larger than a threshold value, the AP 103 determines that the plurality of backhaul links with the AP 102 is not necessary. Meanwhile, when the RSSI in the backhaul link which is used for the main application is less than the predetermined threshold value, the AP 103 determines that the plurality of backhaul links with the AP 102 is necessary.

In step S702, the AP 103 determines whether the plurality of backhaul links with the connection target agent (AP 102) is necessary based on the result of the determination processing in step S701. In a case where the AP 103 determines that the plurality of backhaul links is necessary (YES in step S702), the processing exits the flowchart. Then, the AP 103 maintains the plurality of backhaul links. Meanwhile, in a case where the AP 103 determines that the plurality of backhaul links is not necessary (NO in step S702), the processing proceeds to step S703.

In step S703, the AP 103 stops the target backhaul link. The backhaul link stopped in this processing is the backhaul link determined that an amount of communication traffic (link use rate) is less than the predetermined threshold value in step S701. In a case where the amount of communication traffic (link use rates) of the backhaul links is less than the predetermined threshold value, determination of which backhaul link is to be stopped may be preset in the AP 103. In this case, the AP 103 may perform the determination based on the frequency band (2.4 or 5 GHz) where a backhaul link is established, or perform the determination in such a manner that the backhaul link having a higher amount of communication traffic (link use rate) is kept active. Alternatively, which backhaul link is to be keep active may be selected by the user. According to the present exemplary embodiment, the AP 103 stops the backhaul link with the AP 102, established on the network 108. More specifically, the AP 103 disconnects the wireless LAN connection with the network 108. When the AP 102 performs the processing, the AP 102 stops the network 108.

In step S704, the AP 103 transmits a target backhaul stop message to the AP 101 (controller) to notify the AP 101 that the target backhaul link has been stopped. The stop message transmitted in this step includes the identifier for identifying the target backhaul link. The stop message may include information indicating the reason why the backhaul link has been stopped. The reason of stop may be indicated by an error code. When the AP 103 completes the processing in step S704, the processing exits the flowchart.

In a case where the AP 101 receives the target backhaul stop message, the AP 101 deletes information about the backhaul link from the AP 101 based on the identifier included in the stop message. Alternatively, the AP 101 stores information indicating that the backhaul link cannot be used or has been stopped.

FIG. 7 illustrates the processing performed by the AP 103 to stop a backhaul link with the AP 102. By performing the processing of the flowchart, in a case where stopping one of the plurality of backhaul links established with the AP 102, the AP 103 can notify the AP 101 (controller) of the stop of the backhaul link. This enables the AP 101 to recognize the stopped backhaul link and more suitably control the entire MAP network 111.

While, in the present exemplary embodiment, the WPS method is used in a case where a backhaul link is established, the present invention is not limited thereto. The DPP method is also applicable. In the DPP method, the communication parameters are shared based on by a method conforming to the Wi-Fi DPP standard. In the processing for sharing the communication parameters conforming to the Wi-Fi DPP standard, an apparatus playing a role of offering the communication parameters is referred to as a Configurator, and an apparatus playing a role of obtaining the communication parameters is referred to as an Enrollee. The Enrollee can join a network using the communication parameters obtained from the Configurator. In a case where the Configurator provides the communication parameters to not only an STA but also an AP, the Configurator can instruct the AP to configure a network using the provided communication parameters.

Figure 8:
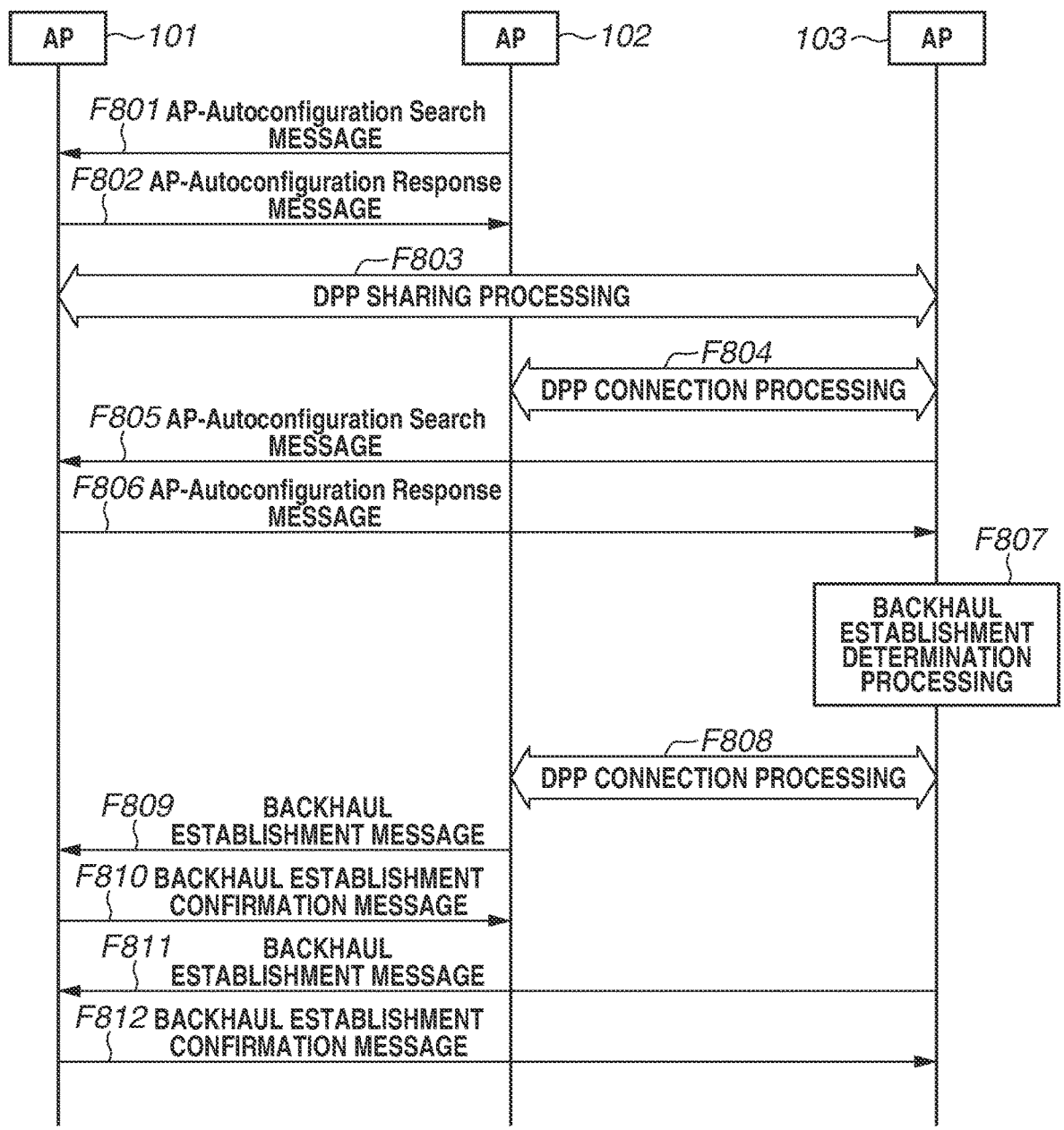
FIG. 8 is a sequence diagram illustrating another example of processing performed in a case where the APs 102 and 103 establish a plurality of backhaul links.

FIG. 8 is a sequence diagram illustrating an example of processing which is performed in a case where the APs 102 and 103 establish a plurality of backhaul links using the DPP method. According to the present exemplary embodiment, the AP 101 operates as a Configurator, and the APs 102 and 103 operate as Enrollees. From start of the sequence illustrated in FIG. 8, the AP 101 has already shared the communication parameters with the AP 102 based on the DPP method, and AP 102 has joined the network 106 configured by the AP 101.

In step F801, the AP 102 transmits an AP-Autoconfiguration Search message to the AP 101 to search for the controller in the MAP network 111. This processing is similar to the processing in step F301 illustrated in FIG. 3.

After receiving a search signal from the AP 102, then in step F802, the AP 101 transmits an AP-Autoconfiguration Response message to the AP 102 since the AP 101 operates as the controller. This processing is similar to the processing in step F302 illustrated in FIG. 3.

Referring to FIG. 3, since the WPS method is used, an AP-Autoconfiguration WSC message is transmitted and received between the APs 101 and 102 and between the APs 101 and 103 (steps F303, F304, F312, and F313 illustrated in FIG. 3). However, in a case of using the DPP method, the transmission and reception of the message are not necessary. Therefore, in this processing, the AP 101 transmits a message including the wireless communication capability information for the APs 102 and 103 and the information about the wireless I/F and a BSS network that can be joined by other APs as a substitution for the WSC message. Alternatively, these pieces of information may be included in the AP-Autoconfiguration Search message transmitted by the APs 102 and 103. Alternatively, the AP 101 may transmit a query message for requesting the APs 102 and 103 to obtain these pieces of information, and the APs 102 and 103 may transmit a response message including the information as a response to the query message.

In step F803, in order for the AP 103 to establish a new backhaul link with the AP 102, the APs 101 and 103 perform DPP sharing processing. The DPP sharing processing includes Bootstrapping processing, Authentication processing, and Configuration processing.

Firstly, the APs 101 and 103 perform the Bootstrapping processing. In the Bootstrapping processing, public key information is shared between the Configurator and the Enrollees. More specifically, the Configurator captures the public key information included in the QR Code (registered trademark) associated with the Enrollees, by the camera function. The present invention is not limited thereto. The public key information may be shared by Bluetooth communication or shared by NFC communication. Alternatively, the public key information may be shared by the PKEX method for sharing the public key information using a common character string between the Configurator and the Enrollees.

Then, the APs 101 and 103 performs the Authentication processing. The Authentication processing refers to authentication processing that is performed between the Configurator and the Enrollees. In this processing, the Configurator and the Enrollees exchange frames of an authentication request, an authentication response, and an authentication confirmation to authenticate the communication partner apparatus with each other.

Then, the APs 101 and 103 perform the Configuration processing. In the Configuration processing, the Configurator provides the Enrollees with a Connector as a communication parameter. The Connector refers to various information that is used in an authentication protocol and a key exchange algorithm defined by the Wi-Fi DPP standard. According to the present exemplary embodiment, the Connector refers to information for joining the network 107 configured by the AP 102. In the Configuration processing, information provided by the AP 101 may include information for identifying the connection destination using the communication parameters, such as the SSID of the connection destination AP. According to the present exemplary embodiment, the AP 103 obtains both the Connector for joining the network 107 and the Connector for joining the network 108.

In step F804, the AP 103 performs DPP connection processing using the Connector obtained from the AP 101. More specifically, the AP 103 joins the network 107 configured by the AP 102, by using the obtained Connector, and then establishes a backhaul link.

In step F805, the AP 103 transmits an AP-Autoconfiguration Search message to the AP 101. In step F806, the AP 101 transmits an AP-Autoconfiguration Response message to the AP 103 as a response to the AP-Autoconfiguration Search message. These pieces of processing are similar to the processing in steps F310 and F311 illustrated in FIG. 3. Like the processing in steps F801 and F802, the AP 103 may transmit in step F805 the wireless communication capability information for the AP 103 and the information about the wireless I/F and a BSS network that can be joined by other APs, or separately transmit these pieces of information by using a different message.

In step F807, the AP 103 determines whether to establish a plurality of backhaul links with the AP 102. This processing is similar to the processing in step F314 illustrated in FIG. 3. According to the present exemplary embodiment, the AP 103 determines to establish a plurality of backhaul links with the AP 102.

In step F808, the AP 103 performs connection processing for connecting with the network 108 using the Connector of the network 108 obtained in step F803. This enables the AP 103 to join the network 108 of the AP 102 and then establish a second backhaul link with the AP 102.

Processing in steps F809 to F812 illustrated in FIG. 8 is similar to the processing in steps F317 to F320 illustrated in FIG. 3.

As illustrated in FIG. 8, the APs 102 and 103 can perform the onboarding processing based on the DPP method. Although, in FIG. 8, the AP 103 obtains the Connectors of the networks 107 and 108 in the first DPP sharing processing, the present invention is not limited thereto. The AP 103 may perform the DPP sharing processing each time when the AP 103 establishes a backhaul link with the AP 102.

As illustrated in FIGS. 3 and 8, the APs 102 and 103 transmit signals to the AP 101 (controller) which are different between the time when the first backhaul link is established and the time when the second and subsequent backhaul links are established. More specifically, in a case where the APs 102 and 103 establish the first backhaul link, the AP 103 communicates the signals described in steps F310 to F313 illustrated in FIG. 3 and steps F805 and F806 in illustrated in FIG. 8 with the AP 101. This enables the AP 101 to recognize that the AP 103 as a new agent has joined the MAP network 111 and that the first backhaul link has been established between the APs 102 and 103. In a case where the second and subsequent backhaul links are established between the APs 102 and 103, at least either one of the APs 102 and 103 communicates the signals described in steps F317 to F320 illustrated in FIG. 3 and steps F809 to F812 illustrated in FIG. 8 with AP 101. By communicating these signals, the AP 101 can recognize that a plurality of backhaul links has been established between the APs 102 and 103.

Although, in the present exemplary embodiment, the APs 102 and 103 do not communicate the signals in steps F317 to F320 illustrated in FIG. 3 and steps F809 to F812 illustrated in FIG. 8 with the AP 101 in a case where the first backhaul link is established, the present invention is not limited thereto. At least either one of the APs 102 and 103 may communicate the signals in steps F310 to F313 illustrated in FIG. 3 and steps F805 and F806 illustrated in FIG. 8 and then communicate the signals in steps F317 to F320 illustrated in FIG. 3 and steps F809 to F812 illustrated in FIG. 8. In this case, the AP 102 may include information about the number of backhaul links established with the AP 103 in the backhaul establishment message. This also applies to the AP 103.

Although, in the present exemplary embodiment, the APs 102 and 103 transmit a backhaul establishment message to the AP 101 to notify the AP 101 of the establishment of a new backhaul link, the present invention is not limited thereto. Instead of or in addition to the backhaul establishment message, the AP 102 may transmit a backhaul number notification message indicating the number of backhaul links established with the AP 103. This also applies to the AP 103.

Although, in the present exemplary embodiment, a plurality of APs connects with each other via a wireless network to perform wireless communication, the present invention is not limited thereto. At least some of the APs may connect with each other via a wired network to perform wired communication. At the establishment of a plurality of backhaul links, one backhaul link may be established via wired communication, and the other may be established via wireless communication.

According to the present exemplary embodiment, the processing which is performed by the AP 103 may be performed by the AP 102. In this case, according to the present exemplary embodiment, the processing which is performed by the AP 102 is performed by the AP 103.

When the communication partner apparatus sharing the communication parameters supports both the WPS and the DPP methods, the APs 101, 102, and 103 may select the DPP method having a higher security level. Alternatively, the APs may determine which pieces of sharing processing is performed, based on a user's selection. Alternatively, in a case where the communication partner apparatus supports only one method, the APs select the method.

At least a part or whole of the flowcharts for the APs 101 and 103 in FIGS. 4, 5, 6, and 7 may be implemented by hardware. In a case where the flowcharts are implemented by hardware, for example, a dedicated circuit may be generated on a Field Programmable Gate Array (FPGA) based on a computer program for implementing each step by using a predetermined compiler. Like the FPGA, a Gate Array circuit may be formed, and the flowcharts may be implemented by hardware. The flowcharts may also be implemented by an Application Specific Integrated Circuit (ASIC). Each step of the flowcharts illustrated in FIGS. 4, 5, 6, and 7 may be performed by a plurality of CPUs or apparatuses (not illustrated) in a distributed way. This also applies to the sequence diagrams illustrated in FIGS. 3 and 8.

Various embodiments of the present invention can also be achieved when a program for implementing at least one of the functions according to the above-described exemplary embodiments is supplied to a system or apparatus via a network or storage medium, and at least one processor in a computer of the system or apparatus reads and executes the program. Further, the present invention can also be achieved by implementations where a circuit (for example, an ASIC) implements at least one function.

According to various embodiments of the present disclosure, in a case where a plurality of links is established between base stations, a control apparatus for controlling a network including a plurality of base stations can recognize the establishment of the links.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While various embodiments of the present disclosure have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-198007, filed Oct. 30, 2019 which is hereby incorporated by reference herein in its entirety.

What is claimed is:

1. A communication apparatus operating as a base station, the communication apparatus comprising:
   at least one processor; and
   at least one memory that stores a set of instructions for causing, when executed by the at least one processor, the communication apparatus to perform operations including:
   communicating with a control apparatus, the control apparatus for controlling a network comprised of a plurality of base stations, wherein each of the plurality of base stations has a function for configuring a base station network, and the communication apparatus is one of the plurality of base stations;
   transmitting, to another base station included in the plurality of base stations, an Association Request for establishing a plurality of links, wherein the Association Request includes information indicating that two or more links are to be established;
   establishing, with the other base station belonging to the network, the plurality of links in accordance with reception of an Association Response that is a response to the Association Request, wherein the plurality of links are used for communication with the other base station; and
   notifying, the control apparatus of information related to the plurality of links at least after the plurality of links are established with the other base station,
   wherein the communication apparatus communicates with the other base station using an existing single link established with the other base station, even in a case where the other base station receives the Association Request that includes information indicating that two more links are to be established, and then decides not to establish the plurality of links, thereby the plurality of links cannot be established.

2. The communication apparatus according to claim 1, wherein the operations further include:
   determining whether the other base station is able to establish a plurality of links to be used for communication,
   wherein, in a case where it is determined that the other base station is not able to establish a plurality of links to be used for communication, the communication apparatus does not establish a plurality of links with the other base station.

3. The communication apparatus according to claim 2, wherein the operations further include:
  determining whether to establish a plurality of links with the other base station in a case where it is determined that the other base station is able to establish a plurality of links,
  wherein, in a case where it is determined to establish a plurality of links with the mother base station, the plurality of links with the other base station are established.

4. The communication apparatus according to claim 2, wherein the operations further include:
  obtaining information about a first link which is to be used for communication and has been established with the other base station, and
  determining whether to establish a plurality of links with the other base station based on the obtained information about the first link in a case where it is determined that the other base station is able to establish a plurality of links.

5. The communication apparatus according to claim 4, wherein the operations further include
  obtaining information about an amount of communication traffic of the first link, and
  determining whether to establish a plurality of links with the other base station based on the obtained information about the first link in a case where it is determined that the other base station is able to establish a plurality of links.

6. The communication apparatus according to claim 1, wherein the operations further include:
  determining, at least after the plurality of links is established with the other base station, whether the plurality of links is necessary with the other base station; and
  stopping one of the plurality of links in a case where it is determined that the plurality of links is not necessary.

7. The communication apparatus according to claim 6, wherein the operations further include obtaining information about amounts of communication traffics of the plurality of links,
  wherein, in a case where an amount of communication traffic of at least any one of the plurality of links is lower than a predetermined threshold value, it is determined that the plurality of links are not necessary, and
  wherein in the stopping, a link having an amount of communication traffic lower than the predetermined threshold value, among the plurality of links, is stopped.

8. The communication apparatus according to claim 1, wherein the link with the other base station is a backhaul link conforming to the Wi-Fi EasyMesh standard and is established by performing a process of sharing communication parameters by the Wi-Fi Protected Setup (WPS) method conforming to the Wi-Fi EasyMesh standard.

9. The communication apparatus according to claim 1, wherein the link with the other base station is a backhaul link conforming to the Wi-Fi EasyMesh standard and is established by performing a process of sharing communication parameters by the Device Provisioning Protocol (DPP) method conforming to the Wi-Fi EasyMesh standard.

10. The communication apparatus according to claim 1, wherein the control apparatus has a role of a controller in the Wi-Fi EasyMesh standard, and the communication apparatus and the other base station have roles of agents in the Wi-Fi EasyMesh standard.

11. The communication apparatus according to claim 1, wherein the information related to the plurality of links are notified to the control apparatus as a notification message.

12. The communication apparatus according to claim 11, wherein, in a case where the communication apparatus has connected with the control apparatus via a wired network, the notification message is transmitted, by using wired communication via the wired network.

13. The communication apparatus according to claim 11, wherein the notification message is transmitted to the other base station by wireless communication via a first wireless network, and the other base station transmits the notification message to the control apparatus by wireless communication via a second wireless network.

14. The communication apparatus according to claim 11, wherein the notification message is a backhaul establishment message indicating completion of establishment of a new backhaul link.

15. The communication apparatus according to claim 11, wherein the operations further include searching for the control apparatus in the network by transmitting a search message different from the notification message.

16. The communication apparatus according to claim 15, wherein the search message is an AP-Autoconfiguration Search message conforming to the Wi-Fi EasyMesh standard.

17. The communication apparatus according to claim 1, wherein the information corresponding to the plurality of links includes information indicating a number of established links, and a frequency band and a frequency channel corresponding to at least one established link.

18. A method for controlling a communication apparatus operating as a base station having a function of configuring a network, the method comprising:
  communicating with a control apparatus for controlling a network comprised of a plurality of base stations, wherein each of the plurality of base stations has a function for configuring a base station network, and the communication apparatus is one of the plurality of base stations;
  transmitting, to another base station included in the plurality of base stations, an Association Request for establishing a plurality of links, wherein the Association Request includes information indicating that two or more links are to be established;
  establishing, with the other base station belonging to the network, the plurality of links in accordance with reception of an Association Response that is a response to the Association Request, wherein the plurality of links are used for communication with the other base station; and
  notifying the control apparatus of information related to the plurality of links at least after the plurality of links are established with the other base station,
  wherein the communication apparatus communicates with the other base station using an existing single link established with the other base station, even in a case where the other base station receives the Association Request that includes information indicating that two more links are to be established, and then decides not to establish the plurality of links, thereby the plurality of links cannot be established.

19. A non-transitory computer-readable storage medium that stores a program for causing a computer included in a communication apparatus operating as a base station having a function of configuring a network to:
- communicate with a control apparatus for controlling a network comprised of a plurality of base stations, wherein each of the plurality of base stations has a function for configuring a base station network, and the communication apparatus is one of the plurality of base stations;
- transmit, to another base station included in the plurality of base stations, an Association Request for establishing a plurality of links, wherein the Association Request includes information indicating that two or more links are to be established;
- establish, with the other base station belonging to the network, the plurality of links in accordance with reception of an Association Response that is a response to the Association Request, wherein the plurality of links are used for communication with the other base station; and
  - notify the control apparatus of information related to the plurality of links at least after the plurality of links are established with the other base station,
  - wherein the communication apparatus communicates with the other base station using an existing single link established with the other base station, even in a case where the other base station receives the Association Request that includes information indicating that two more links are to be established, and then decides not to establish the plurality of links, thereby the plurality of links cannot be established.

20. A communication apparatus comprising:
- at least one processor; and
- at least one memory that stores a set of instructions for causing, when executed by the at least one processor, the communication apparatus to perform operations including:
- transmitting, to another communication apparatus, an Association Request for establishing a plurality of links, wherein the Association Request includes information indicating that two or more links are to be established; and
- establishing, with the other communication apparatus, the plurality of links in accordance with reception of an Association Response that is a response to the Association Request, wherein the plurality of links are used for communication between the other communication apparatus and the communication apparatus,
- wherein the communication apparatus communicates with the other communication apparatus using an existing single link established with the other communication apparatus, even in a case where the other communication apparatus receives the Association Request that includes information indicating that two more links are to be established, and then decides not to establish the plurality of links, thereby the plurality of links cannot be established.

21. The communication apparatus according to claim 20, wherein the operations further include transmitting information that includes capability information indicating that the communication apparatus can establish a plurality of links at a same time.

22. A communication apparatus comprising:
- at least one processor; and
- at least one memory that stores a set of instructions for causing, when executed by the at least one processor, the communication apparatus to perform operations including:
- transmitting, to another communication apparatus, an Association Request for establishing a plurality of links, wherein the Association Request includes information regarding two or more links; and
- establishing, with the other communication apparatus, the plurality of links in accordance with reception of an Association Response that is a response to the Association Request, wherein the plurality of links are used for communication between the other communication apparatus and the communication apparatus,
- wherein the communication apparatus communicates with the other communication apparatus using a single link established with the other communication apparatus, even in a case where the other communication apparatus receives the Association Request that includes the information, and then decides not to establish the plurality of links, thereby the plurality of links cannot be established.

23. The communication apparatus according to claim 22, wherein the operations further include transmitting information that includes capability information indicating that the communication apparatus can establish a plurality of links at a same time.

24. The communication apparatus according to claim 22, wherein the operations further include:
- accepting, based on a user operation, a first operation setting to the communication apparatus, wherein the first operation setting indicates that a function of establishing a plurality of links with an another communication apparatus is disabled; and
- controlling, in a case where the first operation setting is made to the communication apparatus, not to transmit the association request frame, including the information, for establishing the plurality of links.

* * * * *